(12) United States Patent
Reimer

(10) Patent No.: US 6,593,588 B1
(45) Date of Patent: Jul. 15, 2003

(54) SENSORS FOR DETECTING PHYSICAL CONDITIONS

(75) Inventor: Ernest Reimer, Newfoundland and Labrador (CA)

(73) Assignee: Canpolar East Inc., St. John's (CA)

( * ) Notice: Subject to any disclaimer, the term of this patent is extended or adjusted under 35 U.S.C. 154(b) by 0 days.

(21) Appl. No.: 09/979,037

(22) PCT Filed: May 26, 2000

(86) PCT No.: PCT/CA00/00625

§ 371 (c)(1),
(2), (4) Date: Nov. 15, 2001

(87) PCT Pub. No.: WO00/73795

PCT Pub. Date: Dec. 7, 2000

(30) Foreign Application Priority Data

May 28, 1999 (GB) .............................................. 2273585

(51) Int. Cl.⁷ .............................................. G01N 15/06
(52) U.S. Cl. ........................................ 250/573; 204/557
(58) Field of Search ................................. 250/573, 574, 250/559.4, 559.41, 221, 222.2, 238; 356/441, 442, 336–338, 73; 204/557–565, 455–461; 73/64.41, 64.43

(56) References Cited

U.S. PATENT DOCUMENTS

| | | | |
|---|---|---|---|
| 4,732,930 A | 3/1988 | Tanaka et al. | 524/742 |
| 5,131,994 A * | 7/1992 | Shmidt et al. | 204/518 |
| 5,242,491 A | 9/1993 | Mamada et al. | 106/241 |
| 5,425,273 A | 6/1995 | Chevalier | 73/705 |
| 5,801,221 A | 9/1998 | Tanaka et al. | 525/328.4 |
| 6,030,604 A | 2/2000 | Trofast | 424/46 |

OTHER PUBLICATIONS

KINOTEX—Cavity Sensor Technology for Low Cost Automotive Safety & Control Devices—E.M. Reimer/L.H. Baldwin, pp. 1–11, Mar. 2001.

* cited by examiner

Primary Examiner—Que T. Le
(74) Attorney, Agent, or Firm—McFadden, Fincham; Ian Fincham

(57) ABSTRACT

A sensor for detecting changes in a variety of conditions is provided, including temperature, chemical conditions including pH and ion levels, biological antigens, radiation levels, electrical field and pressure applied to the sensor. The sensor body is formed from a material which incorporates an evenly dispersed matrix of light-scattering elements. A light source emits light into the body to form an effective optical cavity in which the light is scattered by the matrix. One or more receivers detects the intensity of scattered or integrated light inside and/or outside of the optical cavity. The matrix and/or the sensor body are composed of materials which reduce or increase the density of light-scattering elements, depending on the conditions applied to the matrix. An increase in the density of the light-scattering elements results in a corresponding increase in the integrated intensity of light received by the receiver, when the receiver is positioned within the optical cavity. At a more distant location, the integrated light intensity at the receiver decreases as the density of scattering elements increases. A processing unit translates the intensity level received by the receiver, into a measure of intensity of the condition detected by the sensor.

26 Claims, 8 Drawing Sheets

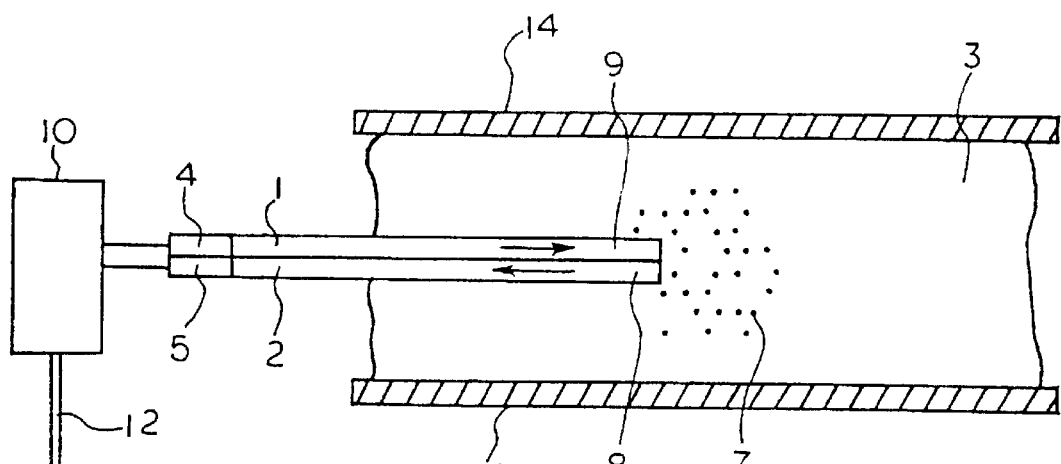
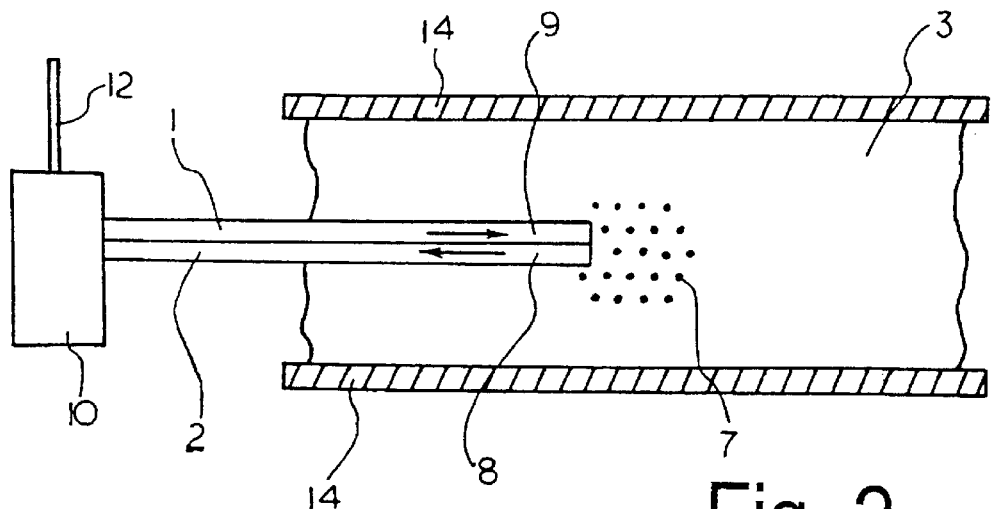

SENSORS FOR DETECTING PHYSICAL CONDITIONS

FIELD OF THE INVENTION

The present invention relates to sensors for detecting changes in a variety of conditions, including temperature, chemical conditions including pH changes and levels of specific ions, levels of biological antigens, radiation levels, and electrical field strength. Sensors for detecting these parameters are based on the principle wherein the integrated intensity of light (or other wave energy) in the vicinity of a light source, diffused and scattered within an optical scattering medium, will increase as the effective concentration of the scattering centers within the medium increases, i.e., as the average distance between scattering centers decreases or as the scattering centers change their light-scattering properties. The sensors and detectors of the present invention may be used in a wide variety of applications, including laboratory and clinical instrumentation as well as industrial uses in a variety of applications wherein detection of these parameters is required.

BACKGROUND OF THE INVENTION

The present invention relies on the principle whereby the intensity of light or other wave energy from a source, which is diffused and scattered within a scattering medium such as translucent foam, is increased in the vicinity of the light source as the effective concentration of scattering centers within the medium increases, i.e., the average distance between scattering centers decreases or their light-scattering properties are enhanced.

The region within the medium which contains scattered light from the source is known as a "virtual optical cavity", in that the properties of an optical cavity are emulated. For convenience, the term "optical cavity" will refer to a virtual optical cavity. The intensity of scattered light at any particular position within an optical cavity is referred to as the "integrated intensity" of the light at that position. Thus, as the medium is compressed by, for example, the application of pressure, the integrated intensity of the light within the region immediately surrounding the light source increases in intensity. The increase is proportional to the increase in concentration of scattering centers. This in turn may be related increases in pressure applied to the medium. A consequent decrease in light intensity occurs within a more distant region within the medium. For example, U.S. patent application Ser. No. 08/895,268 (Reimer et al.) describes a pressure sensor based on this principle, in which the scattering medium may comprise either a material having scattering centers dispersed generally evenly therein, or a hollow deformable container, the inner surface of which diffuses light or other wavelike energy directed into the medium. The light source forms an integrated cavity within the medium, defined by a region containing fully scattered light from the source. When pressure is applied to the medium, the medium compresses and increases the concentration of scattering centers in the region surrounding the light source. The resulting increase in light intensity is detected by a receptor and communicated to an information processor. In one version, a multiplicity of light sources and receivers permits the general location of the pressure to be resolved. Within an apparatus of this type, one or more light sources and detectors are provided, with each source and its corresponding detector being generally adjacent to each other or close together. Most conveniently, the scattering medium comprises a compressible, translucent material such as plastic foam. An array of source/detectors pairs may be provided to provide localized pressure detection means. The detector or detectors are associated with a signal processing unit, which receives information from the detectors corresponding to the detected integrated light intensity levels, and resolves this information into a corresponding pressure level experienced by the scattering medium.

It has not been previously proposed to provide an apparatus which makes use of an integrating optical cavity of the above type for the detection of parameters other than pressure. Thus, any phenomenon, condition or parameter which increases the concentration of scattering centers within a scattering medium, may be detected by means of detecting an increase or decrease in integrated light intensity within the scattering medium, wherein the light is provided by a source of known intensity.

It has been observed that polymer gels, which are generically referred to as hydrogels, can be adapted to serve as a light-scattering medium. An example of such a gel is polyacrylamide. These gels can be engineered to swell or shrink in response to specified chemical or physical changes in their environment. For example, a hydrogel graft copolymer of PMMA (polymethylmethacrylate) and PEG (polyethylene glycol) is pH sensitive. Carboxylic acid groups of the PMMA tend to be protonated at low pH. Hydrogen bonds form between carboxylic acid groups and the ether oxygens on the PEG chain. This reversible ionic polymerization increases the hydrophobicity of the polymer matrix, and water is expelled from the gel and the matrix tends to shrink or collapse. The total resulting volume change can be large, as much as a factor of 1000. If the collapsed gel is exposed to high pH values, the carboxylic acid group become ionized, and the gel becomes more hydrophillic; it then absorbs water and expands. Examples of such a gels have been described by Tanaka in U.S. Pat. Nos. 6,030,604; 5,801,221; 5,242,491; 4,732,930. It is also feasible to provide gels within which functional groups are contained.

It will be understood that within this specification, references to the term "light" apply to other wave energy sources, including sound and non-visible electromagnetic radiation, with suitable and obvious modifications to the apparatus and method embodiments described herein.

SUMMARY OF THE INVENTION

An object of the present invention is to provide an improved sensor which may be adapted to detect levels of various physical phenomena, including pH, temperature, ion level, radiation, electrical field strength, and biologically active antigens.

In one aspect, the invention comprises a sensor for detecting various physical or chemical changes within the environment surrounding the detector. In this aspect, the invention comprises a light source, translucent medium having light scattering centers dispersed therein to fully scatter light from the light source, a detector positioned in the vicinity of the source responsive to the integrated intensity of light from the light source, and an information processing means in communication with the detector for translating the detected light intensity into an electronic signal responsive to the level of a selected physical or chemical parameter. The translucent medium and/or the scattering centers are selected to respond to changes in various physical or chemical parameters by altering either the concentration or reflective properties of the scattering centers in the region surrounding the light source. This region is referred to herein as an "optical cavity", and it is understood that this is defined by a region within the translucent material in the vicinity of the light source, within which light from the light source is fully scattered and an increase in the concentration of scattering centers produces a measurable increase in the integrated intensity of light. Outside the cavity, the intensity of scattered wave energy decreases as the dimension of the cavity decreases. The boundary of the cavity is related to the characteristic scattering length of the medium. Typically the interior of the cavity will be less then one characteristic scattering length removed from the energy source whereas the exterior of the cavity will be more then one characteristic scattering length removed from the energy source.

In one version, the invention comprises a temperature sensor having an electronic output responsive to the temperature of a selected medium. In this version, the scattering medium comprises a solid material such as opal glass, polyethylene or a transparent polymer such as PMMA (polymethyl methacrylate) or a hydrated gel polymer such as polyacrylamide, with an embedded scattering material such as particles of titanium dioxide evenly disbursed within the material. Fluctuations in temperature result in corresponding expansion or contraction of the solid material resulting in a corresponding change in the concentration of the scattering agent within the material. This causes a corresponding increase or decrease in the integrated intensity of light within the integrating cavity. As the coefficients of expansion are relatively small within material of this type, this type of sensor is advantageous for wide temperature ranges. The integrated light intensity is then detected by detection means, communicated to a signal processing means, and converted into an electronic signal.

In a further aspect, a temperature sensor may be based on a temperature-mediated change in the light-scattering properties of a scattering medium. In this version, a light emitter/detector pair is embedded in a translucent material, characterized by a polycrystalline phase transition in the temperature range of interest. Liquid crystals (nematic) are a common example of this type of material. This medium is characterized by reversible temperature—dependent changes in the concentration of crystalline structures within the medium. Crystallization within the medium increases the light scattering in the material. An increase in the temperature of the medium causes a corresponding decrease in concentration of scattering crystal. This in turn results in a corresponding decrease in integrated light intensity within the cavity. The same effects can be achieved using a hydrated gel that passes through a phase transition within a specified temperature range. A sensor of this type is characterized by high sensitivity, within a relatively narrow temperature range.

In a further aspect, a sensor for detection of pH levels comprises a volume of a scattering medium. The scattering medium is comprised of a hydrated polymer gel matrix, within which light scattering particulates such as titanium dioxide particles are evenly dispersed and trapped in the gel as stable light scattering centers. Functional groups on the gel are treated to react over a pH range of interest. It is established in the scientific literature that polymer gels such as a hydrogel graft copolymer of PMMA and PEG may be engineered to swell or shrink in response to specified chemical or physical changes (e.g. see Tanaka, Scientific American, January 1981). As the gel deforms in response to changing pH or other physical or chemical influences, the scattering center concentration undergoes a consequent change, thereby causing a consequential increase or decrease in the integrated light intensity within the optical cavity. A light emitter/detector pair is embedded within the matrix forms an optical cavity within the medium. The integrated intensity of light within the cavity is detected by detector means. Signals from the detector are processed as described above, to generate an electronic signal corresponding to the pH of the medium. In a similar fashion, the sensor may be adapted to respond to other chemical conditions. In particular, the polymer gel may be engineered to respond by expansion or contraction to other chemical conditions such as levels of specific ions.

In a further aspect, a sensor detects levels of specific biologically-active antigens, taking advantage of the molecular biological phenomenon of antibody/antigen reactivity. In this version, an emitter/detector pair is embedded within a scattering medium comprising a hydrated gel matrix, within which functional groups are affixed or embedded which include an affixed immune reagent (or enzyme) with specificity for a designated bio-organic molecule. When the immune reagent binds to the reactant in an antigen/antibody specific reaction, the scattering co-efficient of the immune reagent increases, thereby causing a change in the light intensity within the optical cavity within the gel matrix. The change in intensity is detected by a photoreceptor, which in turn communicates the information to the central processing unit.

In a further aspect, a sensor detects electromagnetic radiation levels. In this version, a radiation sensitive reactant such as bis(4-dimethylaminophenyl)4-vinylphenylmethane-leucocyanide (see for example Tanaka, U.S. Pat. No. 5,242,491) is dispersed throughout a scattering medium. This comprises a photosensitive gel which expands or contracts in response to light exposure. A light emitter and detector is implanted within or in operative association with the medium. The reactant may be adapted to detect visible or near-visible light, ionizing radiation or other forms of electromagnetic radiation. In the case of light, a photo reaction within the reactant in response to light exposure creates scattering centers within the medium. This in turn scatters light emanating from the light emitter, forming an optical cavity within the medium. The detector detects the light intensity within the cavity, which increases as the ambient light level increases. For detection of ionizing radiation, a scattering medium such as glass or PMMA may be provided which is devoid of scattering centers. Exposure to ionizing radiation results in damage to the integrity of the material, with the resulting dislocations and defects acting as scattering centers, which in turn increase the integrated intensity of light within the optical cavity.

In a further aspect, a sensor detects the presence or absence of an electrical field. In this version, a hydrated polymer gel matrix having scattering particulates dispersed therein comprises the scattering medium. The gel incorporates functional groups sensitive to the presence of an electric field. Field sensitivity causes the gel to shrink or swell, thereby changing the effective density of the scattering particulates, thereby changing the integrated light intensity within the optical cavity.

In a further aspect, sensors combine various of the detection means described above. For example, a combined pressure and temperature sensor may be made by providing a scattering medium, within which an emitter/detector pair is positioned, along with a second detector outside the optical cavity. The scattering particulates are coated with a thermochromic substance such as 4,4'-bis(4",4"-(N,N-diethylamino)styryl)-2,2'-bipyridine, which is one example of a large class of commercially available thermochromic paints or inks available from Chromophore, Hallcrest and other suppliers, which changes its optical absorption characteristics in response to temperature changes. In one version, the medium may be an open cell polyurethane foam, 50% compressible in the pressure range of 100 Pa to 10,000 Pa, and coated with a thermochromic paint sensitive in the temperature range from 35° C. to 40° C. This embodiment would have a pressure/thermal sensitivity quite similar to human skin. In this version, the second photodetector enables separate discrimination of absorption effects and cavity deformation effects, thereby permitting the processing unit to discriminate between light intensity changes within the optical cavity caused by temperature changes and those caused by the application of pressure to the medium.

Having thus generally characterized the invention, a detailed description of preferred embodiments of the invention will follow, by way of reference to the attached drawings wherein:

BRIEF DESCRIPTION OF THE DRAWINGS

FIG. 1 is a schematic view of a prior art pressure sensor;

FIG. 2 is a further schematic view of a prior art pressure sensor, in a compressed position;

DETAILED DESCRIPTION OF THE PREFERRED EMBODIMENTS

Figure 3:
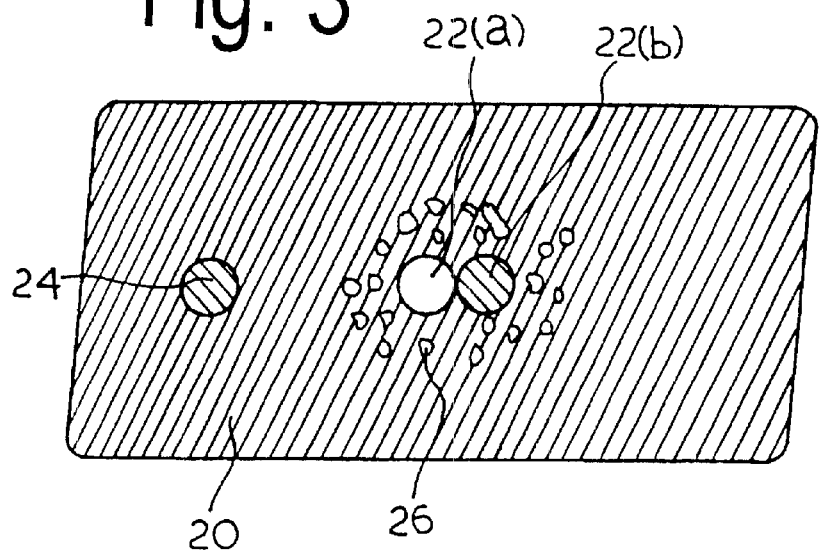
FIG. 3 is a schematic view of a portion of a first embodiment of a pressure sensor according to the present invention.

The present invention relies on the use of a volume of material which is translucent to light and under at least certain conditions contains light-scattering centers which fully scatter light entering the material. A prior art pressure sensor which relies on this principle is illustrated in FIGS. 1 and 2. A sensor of this type is characterized by a scattering medium 5, formed from a deformable compressible material having evenly dispersed therein a plurality of scattering centers. For example, the material may comprise a translucent cellular foam material. A light emitter 4 and detector 6 are positioned within the interior of the material. Conveniently, the light source and detector may comprise fiber optic cables, the free end of which terminates within the interior of the material. The emitter/detector pair are conveniently adjacent to each other or spaced apart by a spacing in the order of several millimeters. The light source 4 illuminates a region 7 within the material, by illumination having a characteristic intensity level. The size of region 7 is determined by the nature of the scattering material, as well as the intensity of light emitted by the light emitter 4. It will be further seen that any convenient source of wave energy may be transmitted into the scattering medium, including electro magnetic radiation within the non-visible spectrum. The nature of the scattering medium will be determined according to the nature of the wave energy.

The light emitter/detector pair communicates via fiber optic cables 1 and 2, with a light source 9 and photoreceptor 11, respectively. The light source 9 may comprise an LED or any other convenient light source. The photoreceptor 11 comprises any conventional light detection means which emits electronic signals responsive to light levels. The light source and photoreceptor respectively both communicate with a signal processing unit 10, which powers the light source, and also translates and resolves the information received from the photoreceptor 11, into a measure of the pressure bearing on the detector. The CPU 10 communicates electronically in turn via a power and data connection line 12, with a downstream receiver such as a display means or the like (not shown).

The scattering medium 3 conventionally forms a thin sheetlike member, bounded on its upper and lower surfaces by a protective layer 14, such as fabric.

Upon compression of the scattering medium as seen in FIG. 2, the scattering centers within the medium become more densely packed together. As a result, the region 7 effectively illuminated by the light source contracts by virtue of the increased density of the scattering centers. In consequence, the integrated light intensity within the region 7 will increase, and this increase is detected by the detector 6. The processing unit 10 in turn translates this information as an increase in pressure experience by the detector. The increase in light intensity is proportional to the deformation of the deformable material. Providing that the coefficient of the deformation of the material is known, the processing unit 10 is thus capable of providing a reading of the pressure experienced by the deformable material.

While the illustrated prior art version shows a single emitter/detector pair, it is feasible to provide multiple, spaced apart emitter/detector pairs to provide a measure of localized pressure bearing on the detector.

The effectively illuminated region 7 within the scattering medium is referred to herein as an "optical cavity". The optical cavity is characterized by a region within which light emitted by the emitter 9 is fully scattered and diffused. Within the optical cavity, the scattered and diffused light increases in intensity as the medium is compressed and the scattering centers are correspondingly concentrated. Light received by the detector is substantially fully scattered and is not received directly from the emitter. The size of the zone of effective illumination, i.e. the virtual optical cavity, will depend on the nature of the scattering medium e.g. primarily the scattering centre density within the medium. The cavity will decrease in volume as the medium is compressed and the scattering center density correspondingly increases.

It will be further seen that compression of the scattering medium, which results in a contraction of the size of the optical cavity and a corresponding increase in light intensity therein, also results in a corresponding decrease in light intensity within a region outside the optical cavity.

A first embodiment of the present invention is illustrated schematically in FIG. 3. In this version, the phenomenon whereby light intensity increases within the optical cavity upon an increase in concentration of the scattering centers, and correspondingly decreases outside the cavity, is harnessed to provide a pressure sensor having enhanced sensitivity. In this version, a deformable and compressible scattering medium 20 is provided, of the general type as comprised above. A relatively closely spaced apart emitter/detector pair 22(a) and (b) communicates with the scattering medium, for example, by means of paired fiber optic cables implanted within the medium. A second detector 24 is provided within the medium 20, at some remove from the emitter/detector pair. The spacing between the second detector and the light emitter will depend in part on the sensitivity of the detector, the intensity of the light emitted by the emitter, and the scattering properties of the medium, e.g., the concentration of light scattering centers. The second detector 24 is positioned outside the optical cavity 26 formed by the light emanating from the emitter 22(a).

Upon compression of the scattering medium, the integrated light intensity within the optical cavity 26 increases. A corresponding decrease occurs in the region immediately outside the optical cavity, within which the second detector 24 is positioned.

Figure 4:
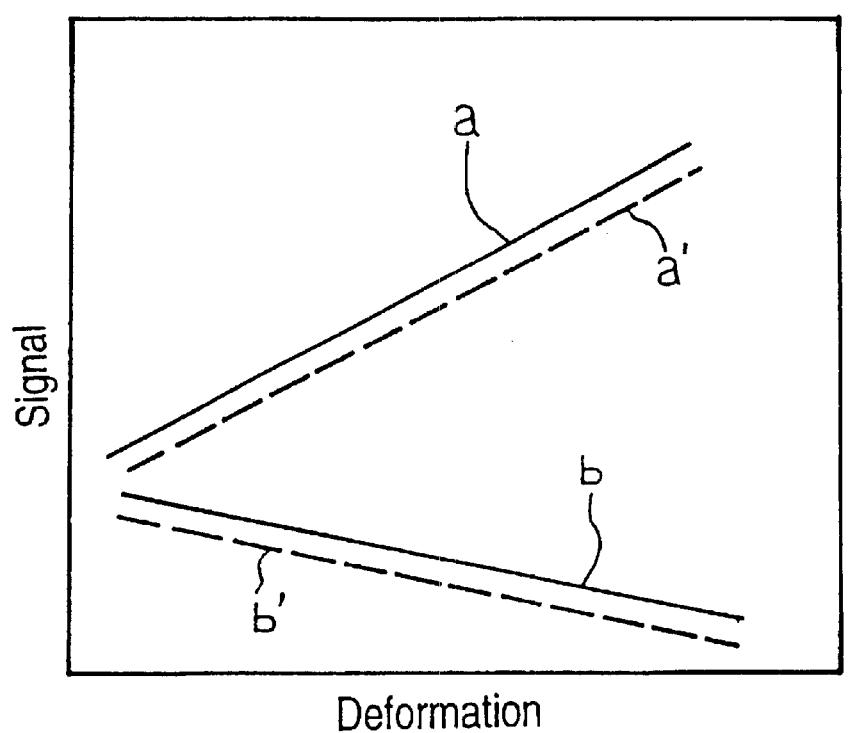
FIG. 4 is a graph illustrating the signals transmitted by a first embodiment pressure sensor, in response to deformation of the sensor.

FIG. 4 illustrates a first signal (line "a") received by the first detector in response to increasing compression of the sensor 22(b), and a second signal (line "b") received by the second detector 24, in response to the compression. It will be seen that with increasing pressure, the first detector detects an increasing integrated light intensity, while the second detector detects a decrease of light intensity. Secondary lines a' and b' represent a proportionate decrease in signal strength lost to light absorption within the scattering medium. The processing unit receives the light intensity information from both detectors 22(b) and 24, and resolves same into a measure of the pressure bearing on the sensor.

The dual detectors of the first embodiment permit enhanced sensitivity of the detector, and a reduction in the interference that would otherwise be experienced. Typically, interference results from a change in the light absorption characteristics of the transmission medium or of the scattering centers. For example, this might occur because of degradation over time of a polymeric scattering medium. A change in absorption characteristics would affect light intensity within the optical cavity and could be mistaken for a deformation effect. The enhanced resolution provided within this version enhances the ability of the detector to differentiate this form of "noise" from "signal".

Figure 5:
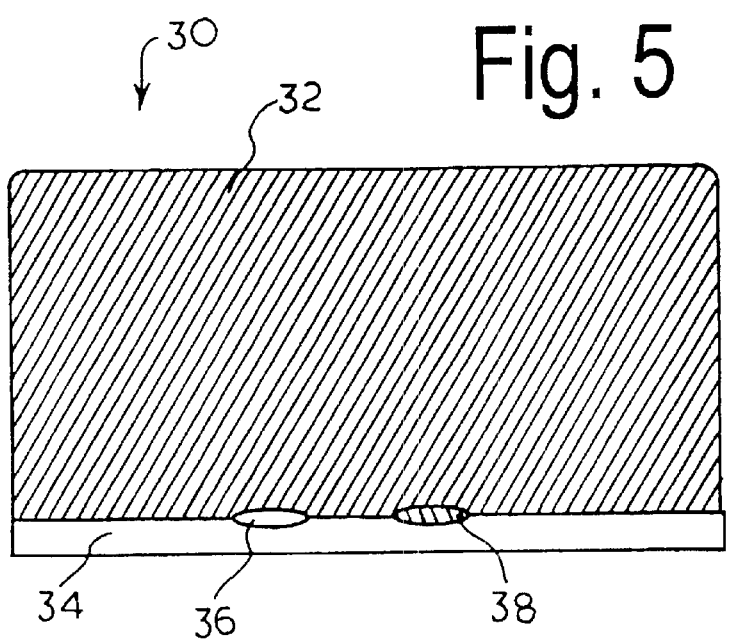
FIG. 5 is a second embodiment of a pressure sensor.
Figure 6:
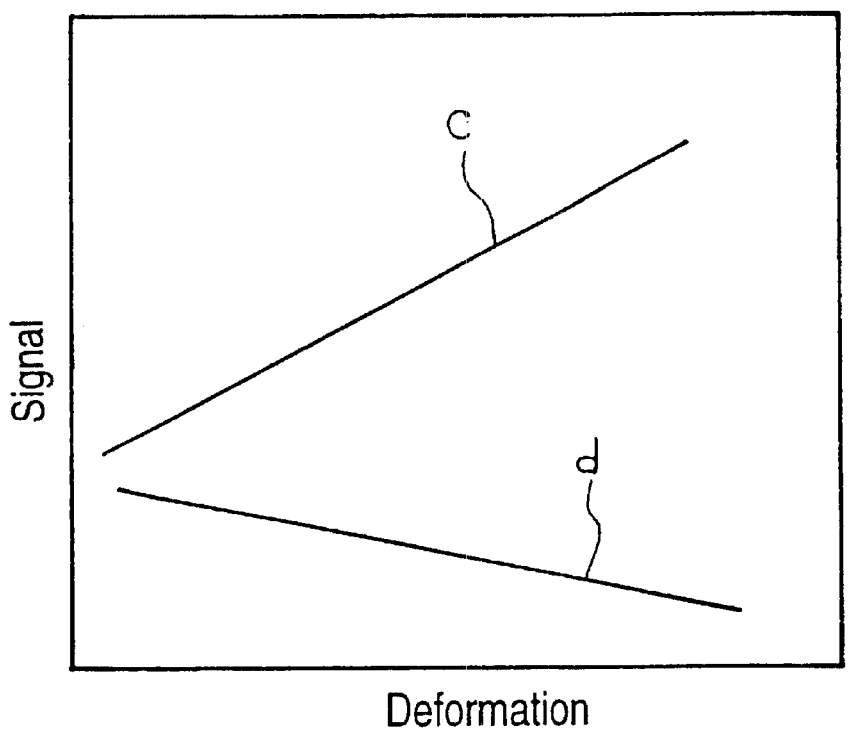
FIG. 6 is a graph illustrating the signals transmitted by the second embodiment pressure sensor in response to deformation.

A further embodiment of the invention provides an example of the variance in signal (i.e., increasing vs. decreasing scattered light level) received by the detector depending on the spacing of the detector from the emitter, as illustrated within FIGS. 5 and 6. FIGS. 5 and 6 illustrate a generally conventional pressure sensor 30 of the type characterized above, comprising a compressible medium 32 such as an open cell urethane foam, laminated to a silicon substrate 34. A light emitting source such as a diode 36 mounted on the substrate directs light into the compressible medium, thereby forming an optical cavity within the region around the light source. A photoreceptor 38 on the substrate is positioned at some remove from the light source. In one version, the spacing is within approximately 2 mm, and in a second version, the spacing between the source 36 and detector 38 is greater then approximately 2 mm. In other versions, the actual spacing will depend on the nature of the compressible medium and the light intensity emitted by the source. The emitter and detector mounted on the silicon type circuit board 34 both "look" in the same direction, with an overlapping field of illumination and field of view. Within the first positioning mode, the sensor is positioned within a "characteristic scattering length" of the emitter, this being a distance within which light intensity increases in response to compression of the medium. In the second mode described above, the sensor is mounted at a distance greater than the characteristic scattering length. The resulting signal received by the respective receiver positions is illustrated within FIG. 6. Integrated light intensity detected by the detector 38 positioned within the field of illumination increases in response to compression of the medium (line "c"), while in the second more removed position, signal strength decreases in response to compression (line "d").

Figure 7:
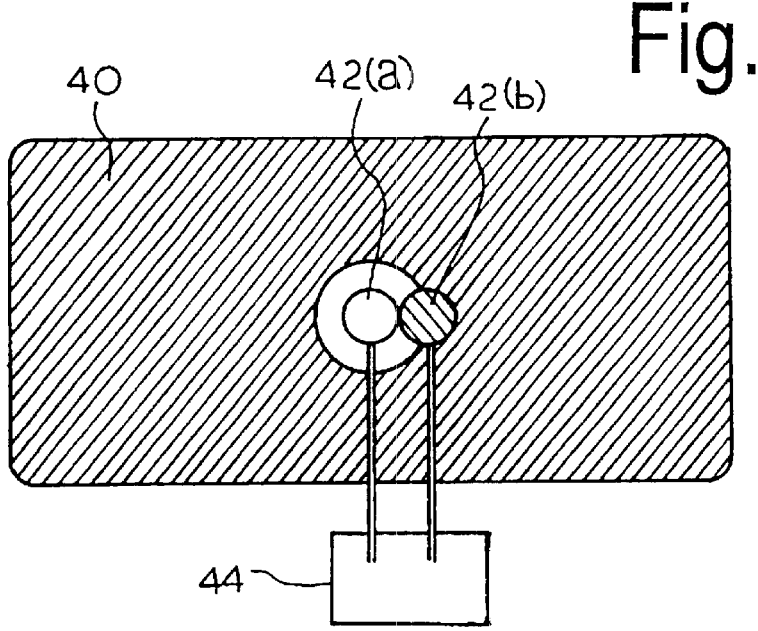
FIG. 7 is a schematic view of a portion of further embodiments of a pressure sensor.

In a further aspect, a sensor for detecting changes in physical, chemical or molecular biological conditions described below may be provided based on the above principles. The detector of this type is illustrated schematically within FIG. 7, and comprises a solid or gel scattering medium 40, having associated therewith an emitter/detector pair 42(a) and (b), of the type described above. The relatively closely spaced-apart emitter/detector pair 42 is associated with processing means 44, of the type described above.

For detection of temperature, the scattering medium comprises a solid or liquid translucent material, and preferably comprises a solid material such as opal glass, polyethylene, or a transparent polymer such as PMMA with an embedded scattering agent such as titanium dioxide particles generally evenly disbursed throughout. The translucent material expands in response to increasing temperature, thereby reducing the concentration of the scattering centers dispersed with the material. A thermal coefficient cubic expansion of such materials is in the order of $10^{-3}$ to $10^{-5}$ per ° C., resulting in a corresponding change in the concentration of the scattering centers. The-resulting perturbation will result in a corresponding change in the integrated intensity of scattered light within the optical cavity formed in the region around the light emitter. As the coefficients of expansion are relatively small, this type of sensor is advantages for wide temperature ranges, for example, a device fabricated through the use of silica optical fibers embedded in opal glass can be used to measure temperature over a range from about 0° C. to 500° C.

In order to achieve a greater degree of sensitivity, for use within a narrower temperature range, the scattering medium may comprise a material which undergoes a polycrystalline phase transition within the temperature range of interest. There exists a large class of hydrocarbon polymers which can be engineered to undergo polycrystalline phase transition over a specified temperature range. Within this type of material, crystallization increases the light scattering properties of the material. Within the transition temperature zone, the characteristic scattering length of the material and therefor the dimensions of the effective optical cavity, will be relatively sensitive to temperature change. An increase in temperature, will cause a decrease in scattering crystal concentration, thereby decreasing the integrated light intensity within the optical cavity. A sensor constructed using a suitable such material may have a transition temperature range of 5° C. to 10° C., and will therefor will produce a relatively large signal in response to a small temperature change.

Figure 8:
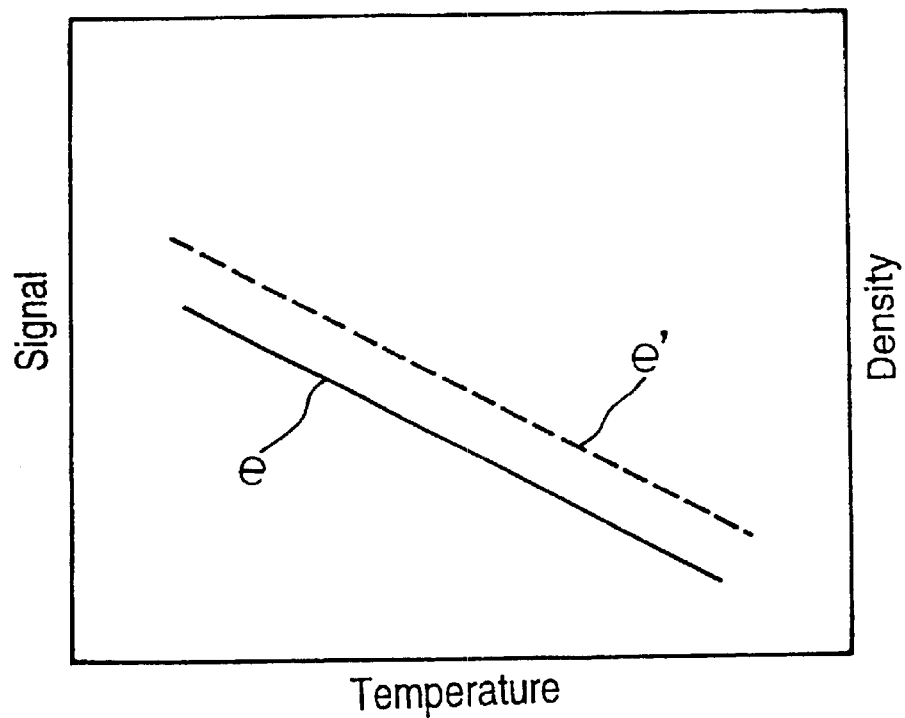
FIG. 8 is a graph illustrating the signal transmitted by the embodiments of FIG. 7, in response to temperature.

FIG. 8 illustrates the signal vs. temperature achieved by the two versions described above. Line "e" represents the signal decreasing in inverse relation to temperature. Line "e'" represents the inverse relation between the density of the scattering medium and increases temperature whereby increasing temperature acts to effectively decrease the density of the scattering centers.

In a further aspect, a sensor detects changes in the acidity level within a medium. In this version the configuration is the same as that shown in FIG. 7. However, the scattering matrix differs. In this version, the emitter/receiver pair 42 is embedded within a hydrated polymer gel matrix 40, having light scattering particulates such as titanium dioxide particles homogeneously dispersed and trapped within the gel. Functional groups on the gel are treated to respond to a pH range of interest. As the gel deforms in response to changes in pH, the scattering centre concentration changes, thereby changing the intensity of light within the optical cavity formed around the light emitter.

Figure 9:
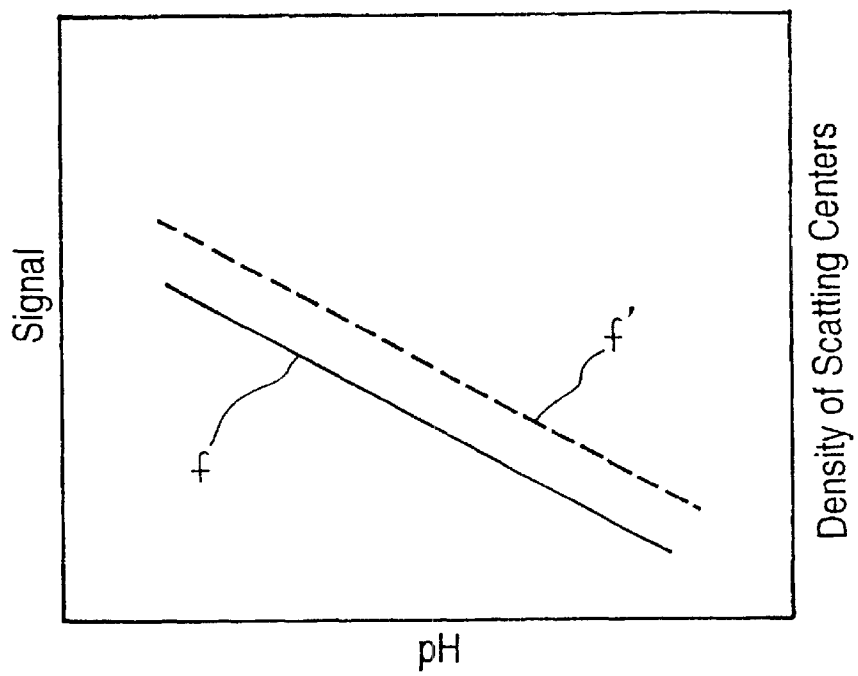
FIG. 9 is a graph illustrating a signal transmitted by the sensor of FIG. 7 in response to pH levels within a medium exposed to the sensor.

FIG. 9 represents the decreasing signal in response to increasing pH (line "f") and the corresponding decrease in density of the medium (line "f'").

Figure 10:
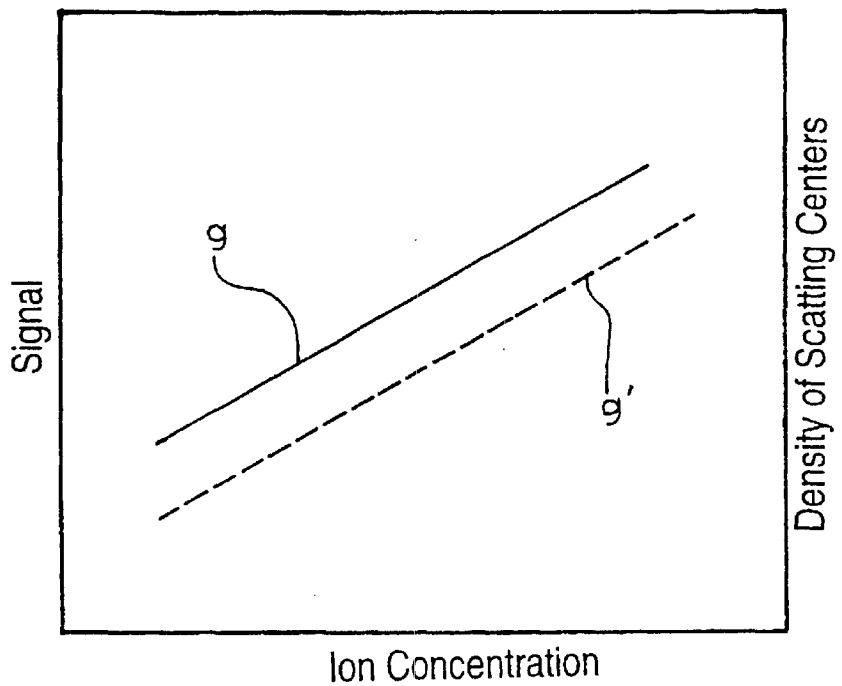
FIG. 10 is a graph illustrating the signal transmitted by the sensor of FIG. 7, in response to levels of selected ions within a medium.

In a further version of this embodiment, the functional groups within the gel matrix may comprise groups sensitive to levels of a specific ion within a medium. FIG. 10 represents the increase in signal strength in response to increasing ion concentration (line "g") and the corresponding increase in density in the scattering medium (line "g'").

Figure 11:
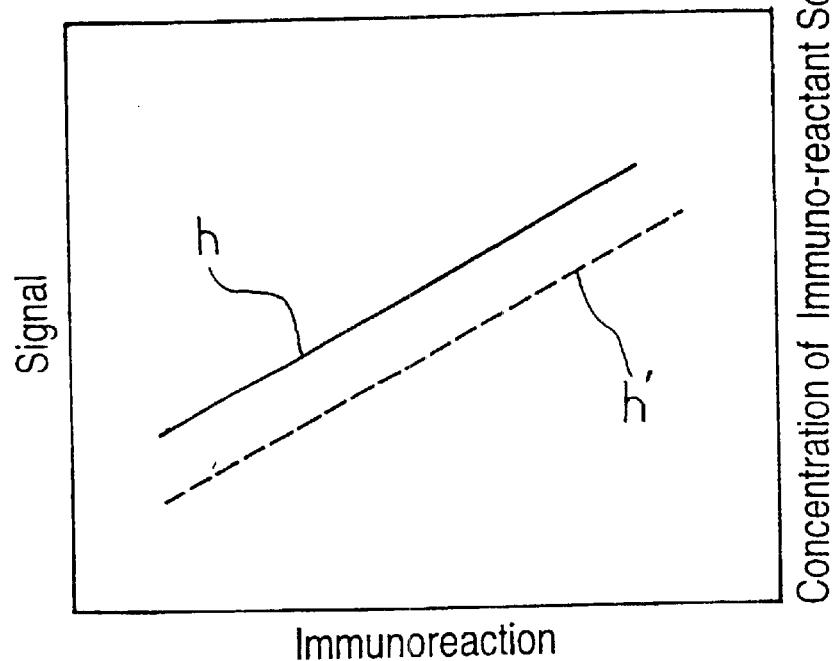
FIG. 11 is a graph illustrating the signal transmitted by the sensor, in response to levels of specific biological antigens or antibodies within a medium.

In a further version of the same embodiment, the functional groups within the gel may be sensitive to molecular biological molecules or materials within a medium. For example, the functional groups embedded in the gel may comprise a particular immune reagent, which binds to a particular antigen in a biological antibody/antigen binding process. Exposure of the gel to the specific antigen results in an antigen/antibody binding reaction. The antibody/antigen complexes form the scattering centers within the gel. As the antibody/antigen complexes form, the scattering coefficient of the gel increases, thereby increasing the integrated light intensity within the optical cavity surrounding the light emitter. FIG. 11 illustrates the signal increase corresponding with increasing antigen concentration (line "h") and increasing scattering center concentration (line "h'").

Within a further embodiment, electromagnetic radiation or an electric field may be detected. In this embodiment, illustrated within FIG. 12, a light scattering medium 50 is encased within a housing 52 which is transparent to radiation having the range of wavelengths of interest, but which is substantially opaque to wave energy within the range of the emitter/detector pair (for example, visible light). Scattering centers dispersed homogeneously within the medium comprise radiation sensitive particles such as 4,4'-bis(4",4"-(N,N-diethylamino)styryl)-2,2' bipyridine, which change the optical scattering parameters within the optical cavity surrounding the emitter/detector 54(a) and (b) upon exposure to radiation. In a further version, the medium 50 is characterized such that ionizing radiation may be detected within a medium such as glass or PMMA which does not have specific scattering centers dispersed therein. In this case, a specific reactant may be unnecessary as the radiation itself may be sufficiently energetic to damage the medium, causing fissures, dislocations and defects therein, which themselves form scattering centers within the optical cavity. The resulting integrated light intensity within the optical cavity detected by the detector 54(b), in response to increasing radiation intensity, is further illustrated.

Figure 13:
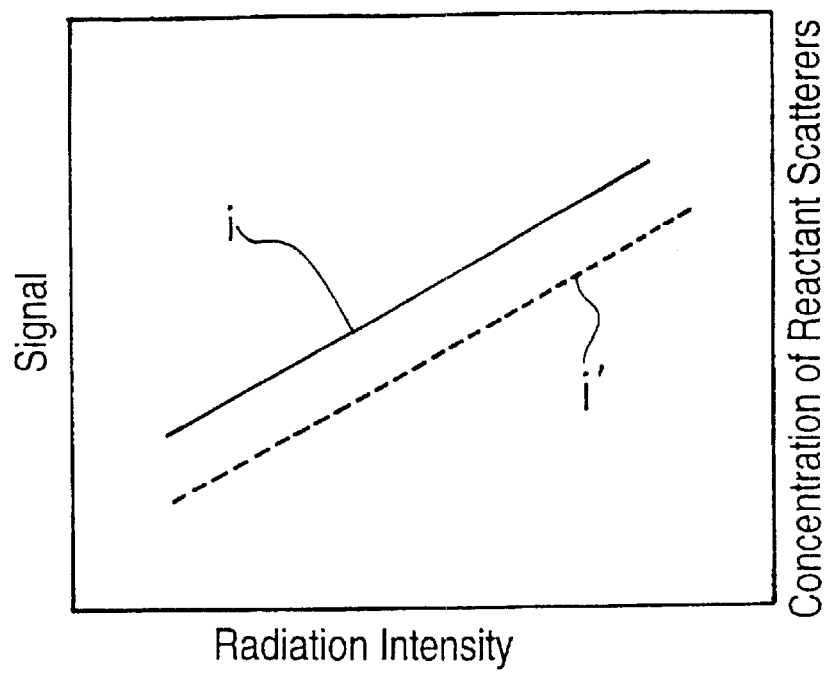
FIG. 13 is a graph illustrating the signal transmitted by the embodiment of FIG. 12, in response to levels of radiation exposed to the sensor.

FIG. 13 illustrates the signal increase proportionate to the radiation level (line "i") and the proportionate increase in scattering center density within the medium (line "i'").

Figure 12:
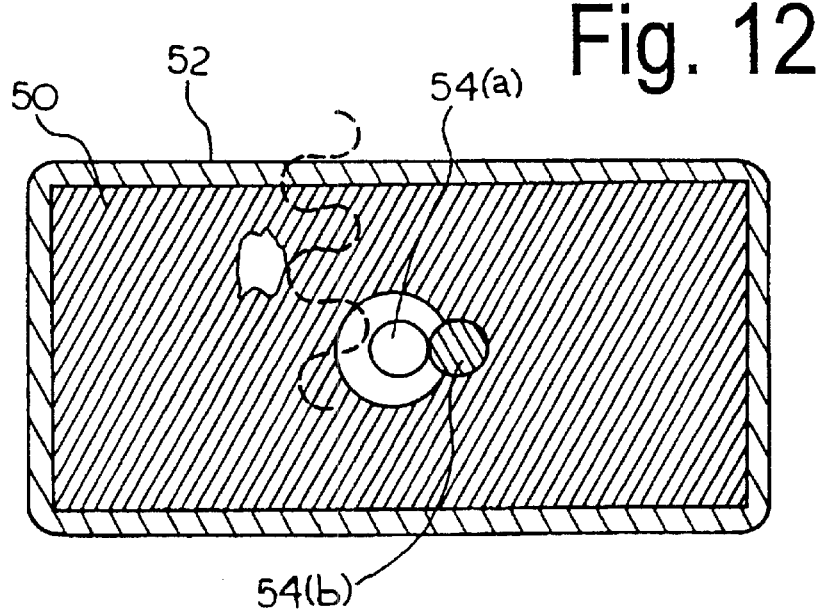
FIG. 12 is a schematic view of a portion of the invention illustrating further embodiments thereof.

In another aspect of the embodiment of FIG. 12, the detector having the same general configuration as shown in FIG. 12 is intended to detect intensity of an electric field. In this version, the scattering medium 50 comprises a hydrated gel such as elastic poly(dimethylsiloxane) combined with an electroheological fluid, a suspension of cross-linked poly (ethylene oxide) particles in silicone oil containing salt and other additives. Such gels are sensitive to the presence of an electric field. Field sensitivity causes the gel to shrink or swell. Scattering centers such as titanium dioxide particles are homogeneously dispersed with the gel. The resulting expansion or contraction of the gel results in a corresponding increase or decrease of light intensity within the optical cavity. In this version, the housing enclosing the gel is transparent to electric fields, but opaque to wave energy within the range of light emitted by the emitter.

Figure 14:
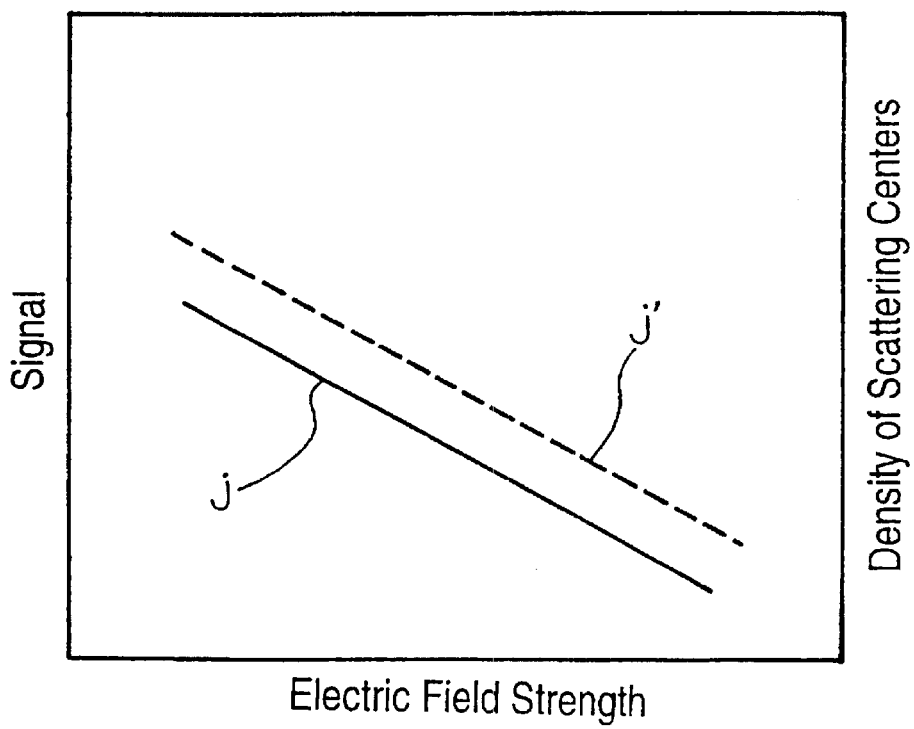
FIG. 14 is a graph illustrating the signal transmitted by the embodiment of FIG. 12, in response to an electric field.

FIG. 14 illustrates within this version the inverse relation between electric field and signal strength (line "j") and the decreasing concentration of scattering centers in the medium (line j').

Figure 15:
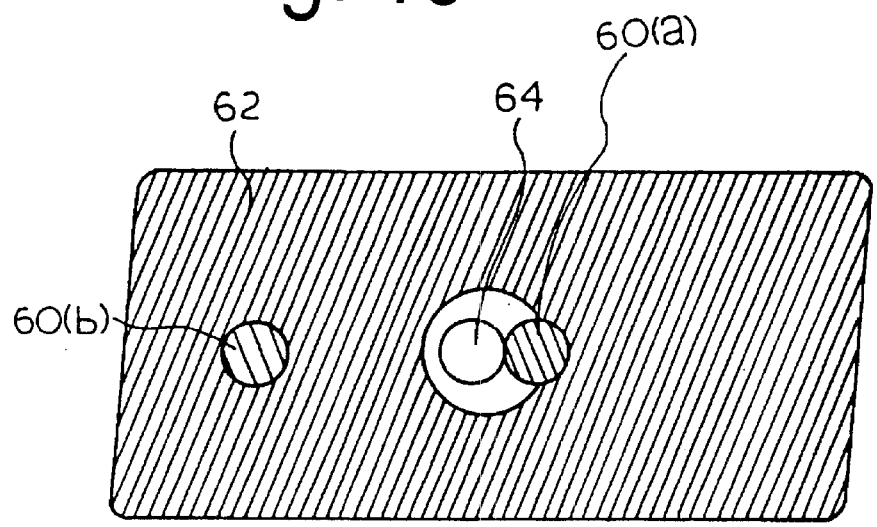
FIG. 15 is a schematic view of a further embodiment of the invention.

In a further embodiment a sensor may detect both temperature and pressure bearing on the detector. In this version, shown schematically in FIG. 15, first and second detectors 60(a) and (b) are embedded within a scattering medium 62. The first detector 60(a) forms a part of a relatively closely spaced emitter/detector pair and is positioned within the optical cavity. The second detector 60(b) is positioned outside the optical cavity, at some remove from the emitter 64. The first detector 60(a) reacts positively to compression of the medium 62, in the conventional manner described above. The second detector 60(b) is positioned sufficiently distant from the optical cavity, to be independent of light intensity changes resulting from pressure bearing on the material. For this type of sensor, the scattering centers comprise particles coated with a thermochromic substance of the type described above, which change their optical absorption characteristics in response to temperature changes. This results in a proportionate change in the integrated light intensity within the optical cavity, and a further corresponding change in the region immediately outside the optical cavity detected by the second receiver. In one version, the scattering medium 62 may comprise an open cell polyurethane foam, compressible by about 50% in the pressure range of 100 Pa to 10,000 Pa, coated with a thermal chromic paint sensitive in the temperature range from 35° C. to 40° C. This version would have a pressure/thermal sensitivity quite similar to human skin.

Figure 16:
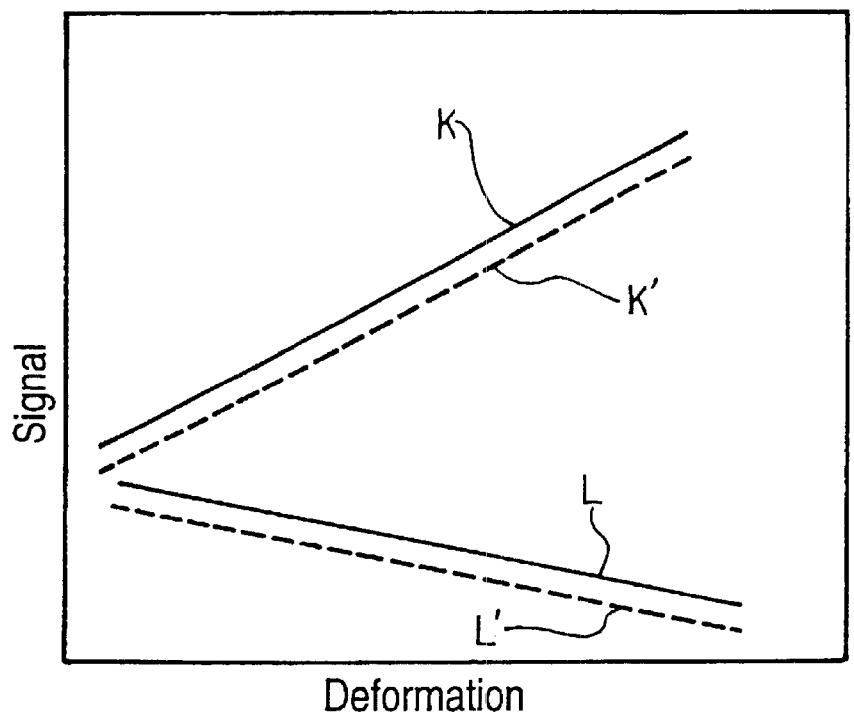
FIG. 16 is a graph illustrating the signal transmitted by the embodiment of FIG. 15, in response to pressure and temperature detected by the sensor.

FIG. 16 illustrates at line "k", the integrated light intensity received by the first detector 60(a) in response to pressure bearing on the scattering medium. Line l' represents signal detected by the second detector 60(b). Lines k' and l' corresponds to the change in the respective signals in response to a decrease in temperature.

I claim:

1. A sensor for detecting physical or chemical conditions, of the type comprising:
   a volume of light-translucent material having light-scattering centers generally evenly dispersed therein;
   a light emitter in operative communication with said material for emitting light into the interior of said material and thereby forming an integrating optical cavity within the interior of said material, said cavity defined by a region within which light from said source is generally fully scattered within one characteristic scattering length from said emitter;
   a first light detector in operative communication with said material for detecting the intensity of scattered light within said optical cavity;
   signal processing means in operative communication with said light detector, for converting said light intensity level into a corresponding electronic signal;
   characterized by:
   either of said light-translucent material or said scattering centers dispersed therein being responsive to changes in physical, chemical or biological conditions within the medium surrounding said material whereby the effective concentration of said scattering centers within said material changes in response to changes in said condition.

2. A sensor as defined in claim 1, comprising a temperature sensor, wherein said material comprises a light translucent material characterized by polycrystalline phase transition properties within a selected temperature range, wherein said material undergoes a reversible change in the concentration of crystalline structures within said temperature range, said crystalline structures comprising said scattering centers.

3. A temperature sensor as defined in claim 2, wherein said material comprises opal glass.

4. A temperature sensor as defined in claim 2, wherein said material comprises a transparent polymer with an embedded scattering agent generally evenly dispersed throughout.

5. A sensor as defined in claim 1 for detection of pH level, wherein said material comprises a hydrated polymer gel matrix having light scattering particles evenly dispersed throughout, and functional groups within said gel which react to the pH level within a surrounding medium by causing said gel to swell or shrink thereby changing the effective concentration of said light scattering particles.

6. A sensor as defined in claim 5, wherein said gel comprises a graft copolymer of PMMA and PEG.

7. A sensor as defined in claim 1 for detection of bio-organic molecules within a medium surrounding said sensor, wherein said scattering material comprises a hydrated polymer gel matrix having light scattering particles evenly dispersed throughout, and functional groups within said gel comprising an immune reagent having specificity for binding to a selected bio-organic substance in an antibody/antigen binding reaction, wherein said light scattering particles comprise said immune reagent, the light scattering properties of which are enhanced upon binding to said bio-organic substance.

8. A sensor as defined in claim 1 for detection of electromagnetic radiation, wherein said translucent material is encased within a housing transparent to radiation within a selected range of wavelengths, but substantially opaque within the range of light emitted by said light emitter, said scattering particles comprising radiation-sensitive particles which change their optical scattering properties in proportion to their exposure to radiation.

9. A sensor as defined in claim 8, wherein said particles are coated with thermochromic ink.

10. A sensor as defined in claim 1, for detection of electromagnetic radiation, wherein said light-scattering material is comprised of a material which fissures, forms dislocations or other defects upon exposure to ionizing radiation, said fissures, dislocations or defects forming said light scattering centers.

11. A sensor for detection of an electric field, wherein a light translucent material comprises a hydrated gel matrix, having evenly dispersed therein particles comprising functional groups which react to the presence of an electric field by causing said gel to shrink or swell.

12. A sensor as defined in claim 11, wherein said gel matrix comprises elastic poly(dimethylsiloxane) combined with an electroheological fluid and a suspension of cross-linked poly(ethylene oxide) particles in oil.

13. A sensor as defined in claim 1, further comprising a second light detector spaced apart from said first detector and positioned outside of said optical cavity, said medium having evenly dispersed therein scattering elements comprising particles coated with a thermo chromic substance adapted to change its optical absorption characteristics in response to temperature changes, said sensor being adapted to detect both pressure sufficient to compress said medium, and temperature changes.

14. A method for detecting physical, chemical or electromagnetic conditions, of the type comprising a sensor to a selected condition and transmitting an electronic signal in response thereto, characterized by the steps of:
   providing a volume of light translucent material having dispersed therein light scattering centers; said material or said scattering centers being responsive to changes in physical, chemical or biological conditions whereby the effective concentration of said scattering centers increases in response to said changes;
   emitting a beam of light into the interior of said material, thereby forming within said material a virtual integrating optical cavity defined by a region within which light from said beam is fully scattered by said scattering centers;
   detecting the intensity of said scattered light with a photodetector;
   converting the detected level of scattered light within said optical cavity into information indicative of a selected physical, chemical or biological condition.

15. A method as defined in claim 14, comprising the step of measuring temperature, wherein said material comprises a light translucent material characterized by polycrystalline phase transition properties within a selected temperature range, wherein said material undergoes a reversible change in the concentration of crystalline structures within said temperature range, said crystalline structures comprising said scattering centers.

16. A method as defined in claim 15, wherein said material comprises opal glass.

17. A method as defined in claim 14, wherein said material comprises a transparent polymer with an embedded scattering agent generally evenly dispersed throughout.

18. A method as defined in claim 14 for detection of pH level, wherein said scattering material comprises a hydrated polymer gel matrix having light scattering particles evenly dispersed throughout, and functional groups within said gel which react to the pH level within a surrounding medium by causing said gel to swell or shrink thereby changing the concentration of said light scattering particles.

19. A method as defined in claim 18, wherein said gel comprises a graft copolymer of PMMA and PEG.

20. A method as defined in claim 14 for detection of bio-organic molecules within a medium surrounding said sensor, wherein said scattering material comprises a hydrated polymer gel matrix having light scattering particles evenly dispersed throughout, and functional groups within said gel comprising an immune reagent having specificity for binding to a selected bio-organic substance in an antibody/antigen binding reaction, wherein said light scattering particles comprise said immune reagent, the light scattering properties of which are enhanced upon binding to said bio-organic substance.

21. A method as defined in claim 14 for detection of electromagnetic radiation, wherein said translucent material is encased within a housing transparent to radiation within a selected range of wavelengths, but substantially opaque within the range of light emitted by said light emitter, said scattering particles comprising radiation-sensitive particles which change their optical scattering properties in proportion to their exposure to radiation.

22. A method as defined in claim 21, wherein said particles are coated with thermochromic ink.

23. A method as defined in claim 14, for detection of electromagnetic radiation, wherein said light-scattering material is comprised of a material which fissures, forms dislocations or other defects upon exposure to electromagnetic radiation within a selected wavelength, said fissures, dislocations or defects forming said light scattering centers.

24. A method for detection of an electric field, wherein a light translucent material comprises a hydrated gel matrix, having evenly dispersed therein particles comprising functional groups which react to the presence of an electric field by causing said gel to shrink or swell.

25. A method as defined in claim 24, wherein said gel matrix comprises elastic poly(dimethylsiloxane) combined with an electroheological fluid and a suspension of cross-linked poly(ethylene oxide) particles in oil.

26. A method as defined in claim 14, further comprising the step of positioning a second light detector spaced apart from said first detector and positioned outside of said optical cavity, said medium having evenly dispersed therein scattering elements comprising particles coated with a thermochromic substance adapted to change its optical absorption characteristics in response to temperature changes, said sensor being adapted to detect both pressure sufficient to compress said medium, and temperature changes.

* * * * *